(12) United States Patent
Badt, Jr. et al.

(10) Patent No.: US 8,977,737 B2
(45) Date of Patent: Mar. 10, 2015

(54) DETECTING LEGACY BRIDGES IN AN AUDIO VIDEO BRIDGING NETWORK

(75) Inventors: Sig Harold Badt, Jr., Richardson, TX (US); Jessy Victor Rouyer, Fort Worth, TX (US); Timucin Ozugur, Fairview, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1504 days.

(21) Appl. No.: 12/004,972

(22) Filed: Dec. 24, 2007

(65) Prior Publication Data

US 2009/0160943 A1     Jun. 25, 2009

(51) Int. Cl.
 G06F 15/173   (2006.01)
 H04N 17/00    (2006.01)
 H04L 12/24    (2006.01)

(52) U.S. Cl.
 CPC ............... *H04N 17/00* (2013.01); *H04L 12/24* (2013.01); *H04L 41/00* (2013.01); *H04L 41/12* (2013.01)
 USPC ............ 709/224; 709/220; 709/250; 709/253

(58) Field of Classification Search
 USPC .......................... 709/203, 224, 250, 253, 220
 See application file for complete search history.

(56) References Cited

U.S. PATENT DOCUMENTS

| | | | | |
|---|---|---|---|---|
| 4,644,468 A * | 2/1987 | Doster et al. | ................ | 709/220 |
| 5,727,157 A * | 3/1998 | Orr et al. | ................ | 709/224 |
| 5,796,736 A * | 8/1998 | Suzuki | ................ | 370/254 |
| 6,584,499 B1 * | 6/2003 | Jantz et al. | ................ | 709/220 |
| 6,769,022 B1 * | 7/2004 | DeKoning et al. | ........... | 709/223 |
| 7,219,124 B2 * | 5/2007 | Cerami et al. | ................ | 709/203 |
| 7,260,597 B1 * | 8/2007 | Hofrichter et al. | ............ | 709/200 |
| 7,325,065 B1 * | 1/2008 | Watkins | ................ | 709/229 |
| 7,363,363 B2 * | 4/2008 | Dal Canto et al. | ............ | 709/223 |
| 7,555,543 B2 * | 6/2009 | Encarnacion et al. | ........ | 709/223 |
| 7,636,771 B2 * | 12/2009 | Torii | ................ | 709/219 |
| 7,680,929 B1 * | 3/2010 | Lyon | ................ | 709/224 |
| 7,693,161 B2 * | 4/2010 | Sung | ................ | 370/401 |
| 7,886,031 B1 * | 2/2011 | Taylor et al. | ................ | 709/221 |
| 2002/0103898 A1 * | 8/2002 | Moyer et al. | ................ | 709/224 |
| 2002/0112058 A1 * | 8/2002 | Weisman et al. | ............ | 709/227 |
| 2002/0156888 A1 * | 10/2002 | Lee et al. | ................ | 709/224 |
| 2003/0110250 A1 * | 6/2003 | Schnitzer et al. | ............ | 709/224 |
| 2003/0225568 A1 * | 12/2003 | Salmonsen | ................ | 703/27 |
| 2004/0117480 A1 * | 6/2004 | Karaoguz et al. | ............ | 709/224 |
| 2009/0070493 A1 * | 3/2009 | Riocreux et al. | ................ | 710/16 |
| 2009/0100174 A1 * | 4/2009 | Annareddy et al. | .......... | 709/224 |
| 2009/0132698 A1 * | 5/2009 | Barnhill, Jr. | ................ | 709/224 |

* cited by examiner

*Primary Examiner* — Michael Y Won

(74) *Attorney, Agent, or Firm* — RGIP LLC

(57) ABSTRACT

In a network having one or more Audio Video Bridging (AVB) devices, non-AVB bridges are detected by transmitting a maintenance message, such as a unicast linktrace message, from one AVB device such as a residential gateway to another AVB device such as a set-top box or IPTV. AVB devices in the path provide replies indicating whether the port on which the linktrace message was received is connected to a non-AVB bridge. The disclosure has utility in diagnostics problems with IPTV in a network.

25 Claims, 4 Drawing Sheets

US 8,977,737 B2

DETECTING LEGACY BRIDGES IN AN AUDIO VIDEO BRIDGING NETWORK

FIELD OF THE INVENTION

This invention relates to networks containing Audio Video Bridging (AVB) devices and in particular to detecting legacy bridges, i.e. non-AVB bridges, in a network.

BACKGROUND OF THE INVENTION

An AVB network is an Ethernet network that can guarantee a high Quality of Service (QoS) between two or more Ethernet end systems. A possible application of AVB is to distribute Internet Protocol Television (IPTV) content within a residence. Currently, this function is performed by other technologies, such as Multimedia over Coax Alliance (MoCA). These other technologies are used exclusively by IPTV and are completely under the control of the network operator. AVB is a shared resource managed by the end user. There are certain technical advantages to AVB that may make it a "fact of life", even though it may be easier for network operators, if IPTV uses a dedicated network.

A problem with AVB networks is that an AVB network is only assured to work correctly if every device in the network is an AVB device, such as an AVB bridge or an AVB end system. It is highly possible that an end user may interconnect legacy bridges, i.e. non-AVB bridges, with AVB devices, causing IPTV to not work correctly. Technically, this problem would be the fault of the end user, but the end user may not be able to diagnose the problem. The end user may blame the network operator for the problem and demand that the network operator must identify and correct the problem. In order to correct the problem, the network operator may operate a customer support service. That service may send a technician to the customer's house. The service may also provide technical support over the telephone or by e-mail. These solutions provide additional expense to the network operator. Similar problems may also exist for other AVB applications.

What is required is a system, method and computer readable medium for avoiding and/or correcting configuration problems in an AVB network that incorporates one or more non-AVB bridges.

SUMMARY OF THE INVENTION

In accordance with one aspect of the disclosure, there is provided a method for detecting the presence of a non-AVB bridge in an AVB network, the method comprising providing at least one maintenance message to one or more AVB devices; receiving one or more replies from one or more of said AVB devices; and determining from said one or more replies whether a non-AVB bridge is present in said AVB network.

In accordance with one aspect of the disclosure, there is provided a method for detecting a partition in an AVB network, the method comprising transmitting at least one message from a first AVB device of said AVB network to one or more other AVB devices of the AVB network; receiving at least one reply from at least one of the one or more other AVB devices, said reply including a network identifier; determining if a network identifier received matches a network identifier of said first AVB device; and determining whether a partition is present in said network dependent on whether a network identifier received matches a network identifier of said first AVB device.

In accordance with one aspect of the disclosure, there is provided an AVB network comprising a plurality of AVB devices; wherein at least a first AVB device is configured to transmit messages; wherein at least one other AVB device is configured to receive a transmitted message; wherein said at least one other AVB device is configured to transmit a reply indicating whether a non-AVB bridge is present on said network; and wherein said first AVB device is configured to process said transmitted replies to determine whether a non-AVB bridge is present.

In accordance with one aspect of the disclosure, there is provided an AVB device of an AVB network configured to receive a message; determine whether said AVB device received said message from a non-AVB bridge; and indicate whether said AVB device received said received message from a non-AVB bridge.

In accordance with one aspect of the disclosure, there is provided a computer readable medium comprising a set of instructions executable on at least one processor, said set of instructions comprising instructions for providing at least one maintenance message to one or more AVB devices; receiving one or more replies from one or more of said AVB devices; and processing from said one or more replies to determine whether a non-AVB bridge is present in said AVB network.

BRIEF DESCRIPTION OF THE DRAWINGS

Embodiments of the disclosure will now be described, by way of example only, with reference to the accompanying drawings in which.

DETAILED DESCRIPTION OF THE INVENTION

In current IPTV architecture, a Residential Gateway (RG) communicates with a Set-Top Box (STB) by way of a dedicated MOCA network. In an alternative approach, the dedicated MOCA network is replaced by a network that conforms to the, yet to be completed, AVB standard. AVB refers to the set of AVB technologies specified by the IEEE 802.1 AVB Task Group. Legacy (non-AVB) bridges are those pieces of equipment compliant with bridging technologies specified in standards such as IEEE Std. 802.1D™-2004, IEEE Std. 802.1Q™-2005, etc. Among AVB devices, AVB bridges are, in essence, Legacy bridges with the additional capability of handling audio video traffic, as specified by the aforementioned Task Group.

AVB has several advantages. One advantage is that the AVB network may already be present in the residence saving the cost of installing a new network just for IPTV. Another advantage is that an AVB network can easily be extended by the end user even over wireless LAN by adding a wireless LAN switch to the AVB network. Another advantage is that the TV can establish a high QoS connection to any other AVB device in the residence.

A disadvantage of the AVB network is that it may be installed and/or modified by the end user. This means it is possible for the end user to install the AVB network incorrectly. One such way an AVB network may be incorrectly configured is by incorporating non-AVB bridges in the network.

AVB devices do work with non-AVB bridges (such as legacy bridges), but AVB can only make QoS guarantees, if every device in the network is an AVB device. If the end user accidentally mixes AVB devices (such as AVB bridges) and legacy bridges, many parts of the network may work satisfactorily without any QoS guarantees, but IPTV may not. Even though, technically, this problem is caused by the end user, the end user may not be able to diagnose the problem, and the end user may blame the network provider for his or her TV not working properly.

Figure 1:
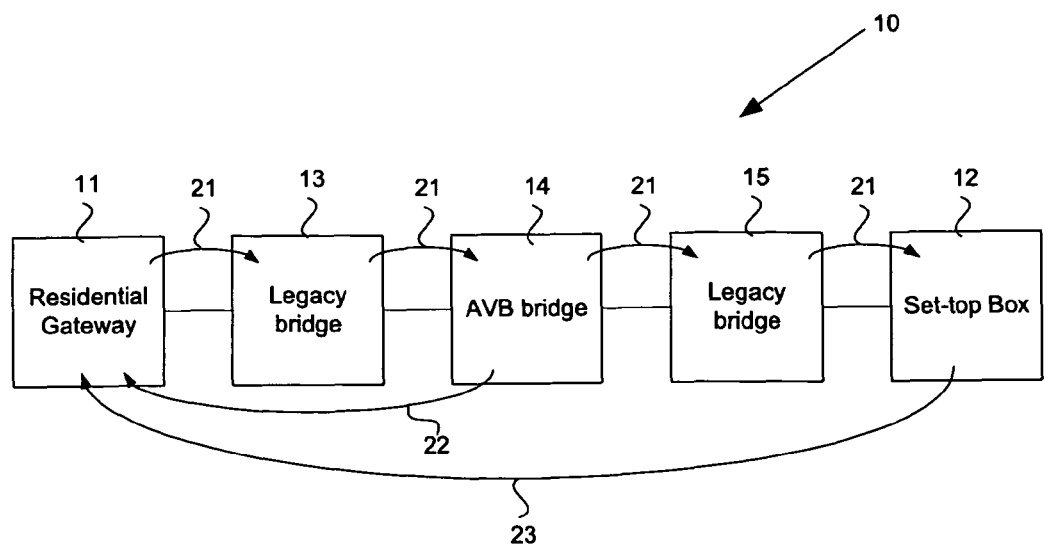
FIG. 1 is a schematic representation of a network using a unicast linktrace message.

In FIG. 1, there is shown a network 10 including non-AVB bridges and AVB devices, including a residential gateway 11 and a Set-Top Box (STB) 12 as the AVB end systems. Between the residential gateway 11 and STB 12 are a number of bridges including a first legacy bridge 13, an AVB bridge 14 and a second legacy bridge 15. The presence of the legacy bridges 13, in an AVB network is a problem because it can cause the AVB Service Reservation Protocol (SRP) to fail. With existing technology, a legacy bridge can only be discovered by an adjacent AVB bridge.

In accordance with an embodiment of the disclosure, in-band maintenance messages are used to discover the presence of the legacy bridges from the residential gateway end and/or the STB end. In one embodiment, the maintenance message is a unicast linktrace message 21 transmitted between a residential gateway 11, or a point upstream of a residential gateway, and a STB 12 or an IPTV. The unicast linktrace message 21 passes through every bridge 13, 14, 15 along the way.

In one embodiment, every intermediate AVB bridge 14 sends a unicast linktrace reply 22 back to the residential gateway 11. A final unicast linktrace reply 23 is also sent from the STB 12. The linktrace replies may be configured to include a "non-AVB indicating" flag, which may be a single bit, which can be used to indicate that the AVB bridge which sent the linktrace reply is not connected to an AVB bridge. For example, the AVB bridge may be configured to determine on which port the AVB bridge received the unicast linktrace message and to determine whether that port is talking to a non-AVB bridge. Each linktrace reply may be processed to determine whether the non-AVB indicating flag is set.

In one embodiment, the linktrace replies may be configured to include a list of all the AVB bridges through which the unicast linktrace message passed on the way from the residential gateway, as the trace originator, to the AVB device that sent the reply. Flags may also be used within the list to identify those AVB devices connected to non-AVB bridges. In this embodiment, it may only be necessary to process the reply received from the STB, as the final destination of the trace, to determine whether any non-AVB bridges are present on the relevant portion of the network.

In another embodiment, the linktrace replies may be collected by the residential gateway, as the trace originator, for the residential gateway to build a list of all the AVB bridges through which the unicast linktrace message passed on the way from the residential gateway, as the trace originator, to the AVB device that sent the reply. Flags may also be used within the list to identify those AVB devices connected to non-AVB bridges. In this embodiment, it may be necessary to process the replies received from all the AVB devices and the STB, as the final destination of the trace, to determine whether any non-AVB bridges are present on the relevant portion of the network.

Once the presence of a non-AVB bridge in the network has been detected, other network diagnostics may be applied to correct any network issues, in particular in the performance of IPTV protocols. While it may only be necessary to determine whether any non-AVB bridges are present in the network, more complex diagnostics may be provided using combinations of flags of individual replies and the lists of AVB devices provided in the linktrace replies, or the list of AVB devices built from the linktrace replies.

For the purpose of the present description, the linktrace message is described as being unicast from the residential gateway 11 to the STB 12 though the person skilled in the art will readily understand that the embodiment may be modified to reverse the direction of the unicast linktrace message. The unicast linktrace message can also be sent from an AVB device (not shown) upstream of the residential gateway 11.

A unicast message between these AVB end systems may not pass through every AVB device on the network, but will determine whether a non-AVB bridge has been used in the path between the residential gateway and the STB. While unicast messages are suitable, they are just one available message form and the person skilled in the art will readily understand that other message transmission styles may be used.

Figure 2:
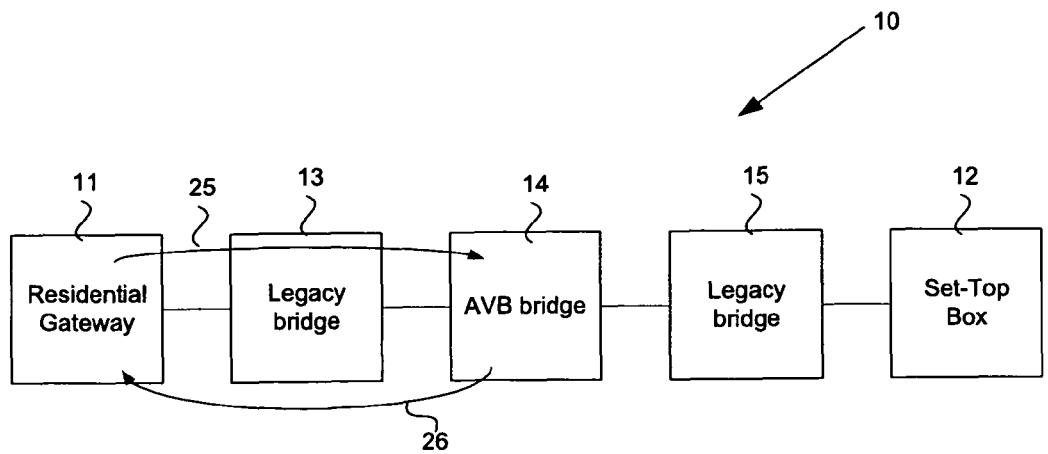
FIG. 2 is a schematic representation of a network using a loopback message.

In an alternative embodiment illustrated in FIG. 2, a unicast loopback message 25 can be sent from the residential gateway 11, or some point upstream of the residential gateway, to any AVB bridge 14 or AVB end system, such as the STB 12. The receiving AVB bridge 14 or AVB end system, such as the STB 12, responds by sending a unicast loopback reply 26 back to the residential gateway. There are one-bit flags in the unicast loopback reply similar to the flags described above, for indicating whether the targeted AVB bridge 14 or AVB end system, such as the STB 12, is connected to a non-AVB bridge. Similarly, the loopback reply may contain a list of AVB devices through which the loopback message has passed from its origin. The flags of the loopback reply may be analyzed in a similar manner as described above to determine whether any non-AVB bridges are present in the relevant portion of the network.

Figure 3:
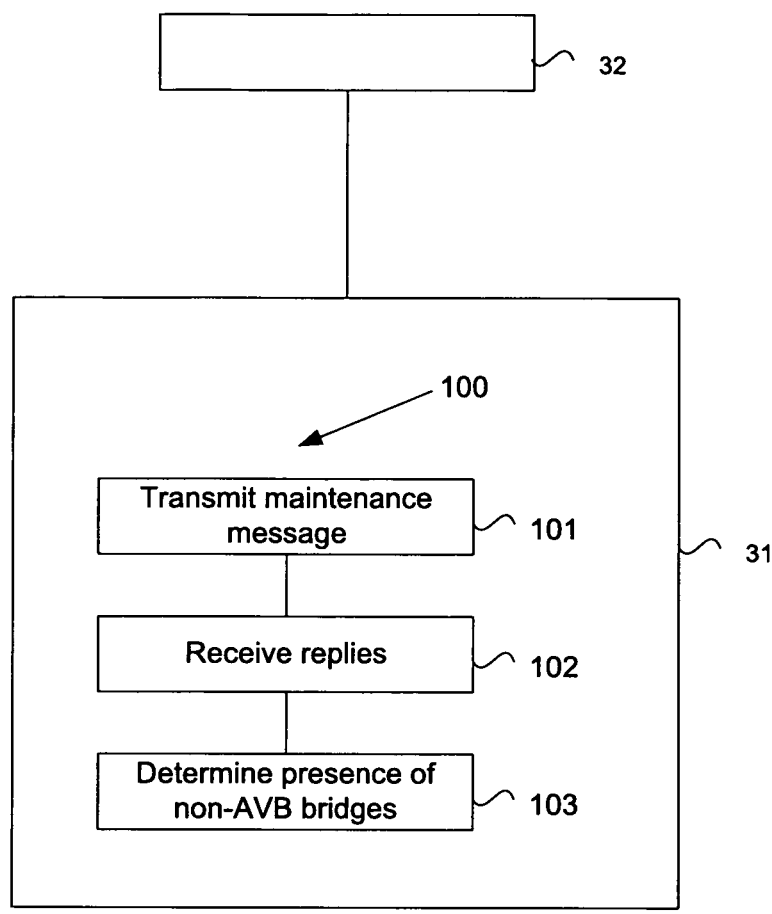
FIG. 3 shows a processor for executing an instruction set in accordance with an embodiment of the disclosure.

FIG. 3 illustrates a processor 31 in operative association with at least one memory 32. The memory 32 includes a memory storing a set of instructions 100 executable by the processor 31. The set of instructions 100 executed by the processor may include transmitting a maintenance message 101 to one or more AVB devices on the AVB network, receiving one or more replies 102 and processing the replies 103 to determine whether there are any non-AVB bridges present on the network.

In one embodiment, the processor 31 is a processor of a residential gateway. In one embodiment, the processor 31 is a processor of a STB. In one embodiment, the processor 31 is a processor of a TV.

Figure 4:
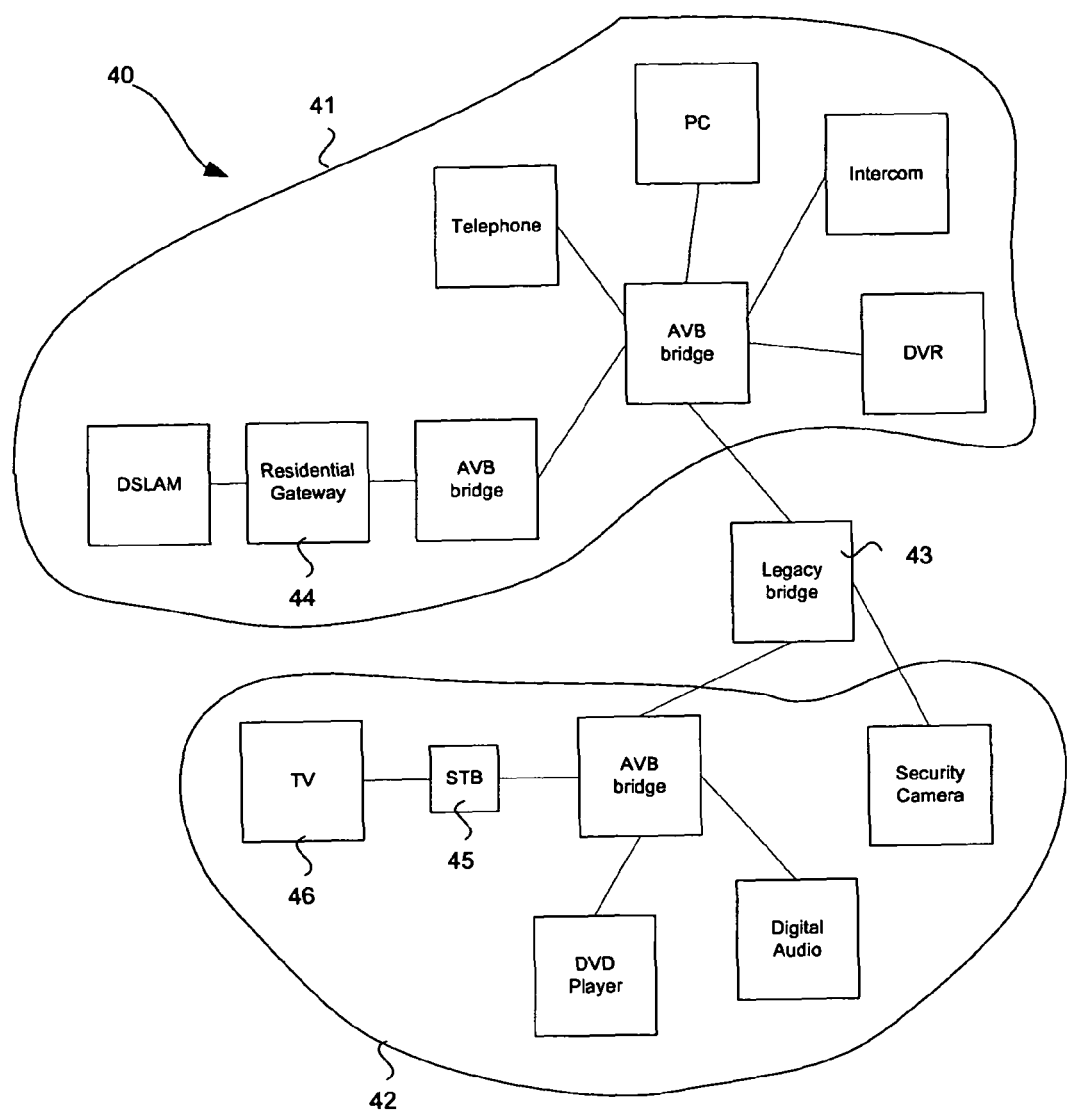
FIG. 4 is a schematic representation of a partitioned network using a network identifier.

In FIG. 4 there is shown an extended AVB network 40 including common AVB end systems additional to the residential gateway 44, STB 45 and TV 46. In the network 40, a legacy bridge 43 has been inserted at a node that is not a leaf node. The legacy bridge 43 thus has the effect of partitioning the network 40 into two disjoint AVB networks 41, 42.

In one embodiment, each contiguous AVB network 41, 42 may generate a unique identifier. Upper layer discovery protocols, such as the application layer protocol named Universal Plug and Play (UPnP) protocol can use this identifier to differentiate AVB networks that are separated by legacy bridges. This allows upper layer protocols to know when two AVB bridges are on the same AVB network and can be interconnected using SRP.

It is possible for every contiguous AVB network to dynamically generate a unique identifier (network ID). There are a number of algorithms that can be designed for this purpose. One algorithm is based on the observation that every AVB bridge has a clock, as specified in the IEEE P801.1Qas draft specification. In AVB, all these clocks are synchronized. These clocks are synchronized by all setting their time from the same master clock. That master clock is called the "Grand Master Clock" (GMC). The GMC is always a clock in one of the AVB devices. An automated algorithm called the "Best Master Clock" (BMC) algorithm picks a single clock on a single AVB device to be the GMC for the whole network. The BMC algorithm informs every other AVB device in the network of the identity of the GMC. Therefore, the identifier of the GMC can be used as a unique AVB network identifier.

The BMC algorithm can operate so that no two networks ever pick the same identifier for their GMCs, even if those two networks have no communication with each other. This can be accomplished by making every clock identifier contain a field that is the globally unique Ethernet MAC address of a port on the AVB device that contains the clock. Other methods of making GMC identifiers globally unique are also possible.

In the present embodiment, replies to maintenance messages are modified to not carry the bit flags described earlier. Instead, the unicast linktrace reply can contain the network identifier of the network of the AVB device that sent the reply. If there is a legacy bridge between the AVB device that sends the unicast linktrace message and the AVB device that sends the unicast linktrace reply, the network identifier in the reply is different from the network identifier of the AVB device that sends the linktrace message. The replies can therefore be analyzed, with different network identifiers indicating the presence of a legacy bridge somewhere in the network. This same scheme can also be applied to loopback replies.

In one embodiment, network identifiers as described above are used in conjunction with UPnP. The conventional UPnP has three major functions:
1. a device on a network can discover other devices on the same network;
2. a device on a network can discover what services are offered by another device it has discovered; and
3. a device on a network can control services offered by another device on the same network Although UPnP is still a work in progress, it is possible that UPnP will frequently be used in conjunction with AVB. UPnP operates in phases. The first two phases are called "Discovery" and "Description." In the Discovery phase, devices connected to the network announce their presence by multicasting short advertisements using the Simple Service Discovery Protocol (SSDP) protocol. Every other device on the network receives these advertisements. In the Description phase, a device uses the HyperText Transfer Protocol (HTTP) to inquire about the services and internal devices offered by another device on the same network. As UPnP is currently designed, a STB can use UPnP to discover and control a residential gateway and a residential gateway can use UPnP to discover and control a STB, but UPnP cannot be used to discover that there is a legacy bridge between the residential gateway and the STB.

Figure 5:
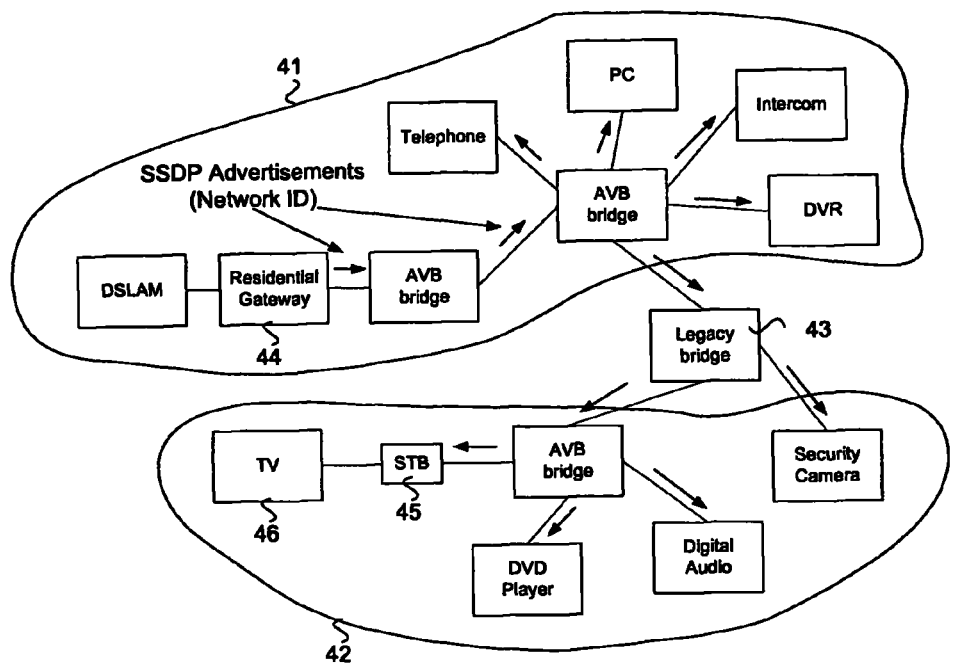
FIGS. 5 and 6 are schematic representations showing a partitioned network using a Universal Plug and Play (UPnP) protocol.
Figure 6:
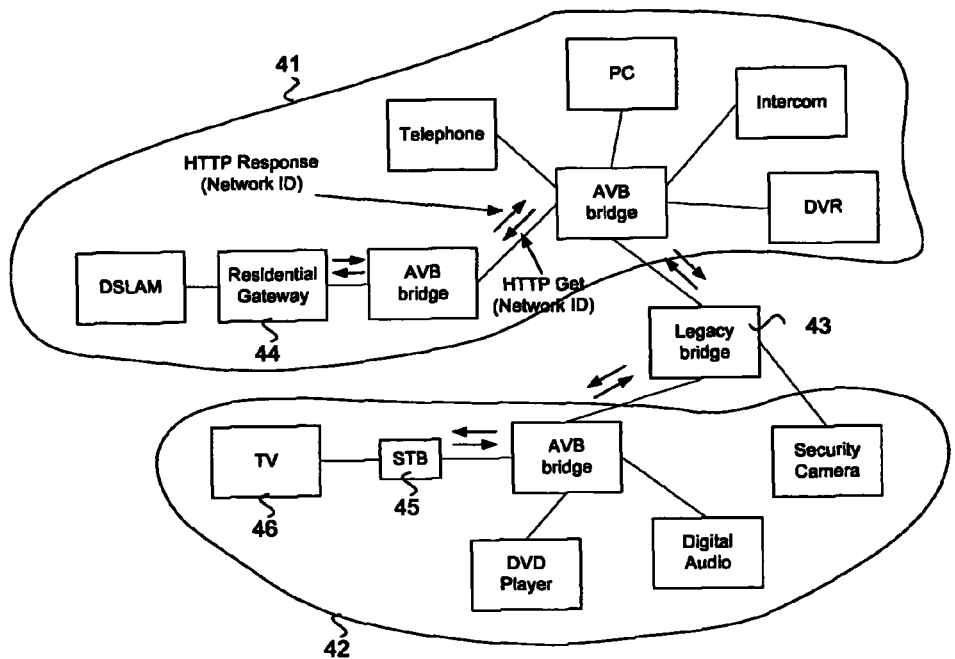

In a modification of the conventional UPnP protocol, the AVB network ID is included in SSDP advertisements as shown in FIG. 5. In addition, the AVB network ID is included in the reply to the HTTP get as shown in FIG. 6. With either of these changes, if there is a legacy bridge 43 between the residential gateway 44 and the STB 45 (or TV 46), the AVB network ID in the protocol message is different from the AVB network ID of the AVB device receiving the protocol message. The person skilled in the art will readily understand that there are other protocols that offer services similar to UPnP. The AVB network ID can also be added to those protocols.

While the embodiments have been described as using a STB, it will be apparent to the person skilled in the art that the STB may be isolated from the TV. Alternatively, where the TV is appropriately configured, the STB may be removed from the network altogether. The in-band maintenance protocol described above can also be implemented in a speaker or any other piece of equipment likely to participate in an AVB network.

References are given to Institute of Electrical and Electronics Engineers (IEEE) standards and draft standards; however the use of such references should not be construed as limiting the applicability of the invention to the given version of those standards (or implementations based on those standards; the invention remaining applicable to standard-compliant and non-standard-compliant implementations): most probably, future revisions of, or amendments to those standards should not limit the applicability of the invention.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for detecting the presence of a non-Audio Video Bridging bridge in a network comprising Audio Video Bridging devices, the method comprising:
   transmitting at least one maintenance message to one or more Audio Video Bridging devices;
   receiving one or more replies from one or more of said Audio Video Bridging devices, the one or more replies including at least one data indicator representing the presence of a non-Audio Video Bridging device; and
   determining from said one or more replies whether the non-Audio Video Bridging bridge is present in said Audio Video Bridging network.

2. The method according to claim 1 wherein the maintenance message is between a residential gateway and a set-top box.

3. The method according to claim 1 wherein the maintenance message is between a residential gateway and a TV.

4. The method according to claim 1 wherein the maintenance message passes from an origin to a destination through one or more network bridges.

5. The method according to claim 4 wherein an Audio Video Bridging device receiving said maintenance message generates a reply to said origin, said reply indicating whether said Audio Video Bridging device received said maintenance message from a non-Audio Video Bridging bridge.

6. The method according to claim 5 wherein an Audio Video Bridging device receiving said maintenance message determines whether said maintenance message was received on a port in communication with a non-Audio Video Bridging bridge.

7. The method according to claim 5 wherein determining whether a non-Audio Video Bridging bridge is present comprises determining whether any reply includes an indication that the Audio Video Bridging device providing the reply received the maintenance message from a non-Audio Video Bridging bridge.

8. The method according to claim 5 wherein a reply comprises a list of Audio Video Bridging devices through which said maintenance message has passed from the origin.

9. The method according to claim 5 wherein the origin builds a list of Audio Video Bridging devices on said network from said replies.

10. The method according to claim 4 wherein an Audio Video Bridging device receiving said maintenance message forwards said maintenance message toward said destination with an indication of whether said Audio Video Bridging device received said maintenance message from a non-Audio Video Bridging bridge.

11. A method for detecting a partition in a network comprising one or more Audio video Bridging devices, the method comprising:
    transmitting at least one message from a first Audio Video Bridging device of said network to one or more other Audio Video Bridging devices of the Audio Video Bridging network;
    receiving at least one reply from at least one of the one or more other Audio Video Bridging devices, said reply including a network identifier and including at least one data indicator representing the presence of a non-Audio Video Bridging device;
    determining if a network identifier received matches a network identifier of said first Audio Video Bridging device; and
    determining whether a partition is present in said network dependent on whether a network identifier received matches a network identifier of said first Audio Video Bridging device.

12. The method according to claim 11 further comprising generating a network identifier for said first Audio Video Bridging device and at least one of said other Audio Video Bridging devices.

13. The method according to claim 12 wherein each of said network identifiers is dependent on at least one master clock.

14. The method according to claim 11 wherein said network identifier is included in at least one of a Simple Service Discovery Protocol advertisement and a reply to a Simple Service Discovery Protocol of a Universal Plug and Play protocol.

15. The method according to claim 11 wherein said first Audio Video Bridging device is one of a residential gateway, a set-top box and a TV and wherein said at least one other Audio Video Bridging device is at least one of residential gateway, a set-top box, a TV and an Audio Video Bridging device.

16. A network comprising:
    a plurality of Audio Video Bridging devices;
    wherein at least a first Audio Video Bridging device is configured to transmit messages;
    wherein at least one other Audio Video Bridging device is configured to receive a transmitted message;
    wherein said at least one other Audio Video Bridging device is configured to provide a reply indicating whether a non-Audio Video Bridging bridge is present on said network, the reply including at least one data indicator representing the presence of a non-Audio Video Bridging bridge; and
    wherein said first Audio Video Bridging device is configured to process said provided replies to determine whether the non-Audio Video Bridging bridge is present.

17. A network according to claim 16 wherein said first Audio Video Bridging device is configured to transmit a message to a destination through a path between said first Audio Video Bridging device and said destination, said path including at least one network bridge, and wherein said first Audio Video Bridging device is configured to process said replies to determine whether at least one network bridge in said path includes a non-Audio Video Bridging bridge.

18. A network according to claim 16 wherein at least one known Audio Video Bridging device is configured to generate a network identifier and wherein an Audio Video Bridging device receiving a message transmitted from said first Audio Video Bridging device is configured to provide a reply to said first Audio Video Bridging device, said reply including said network identifier.

19. An Audio Video Bridging device of a network comprising:
    a receiver configured to receive a message that is sent to at least one known Audio Video Bridging device on the network; and
    a processor configured to
        determine whether said Audio Video Bridging device received said message from a non-Audio Bridging bridge, the message including at least one data indicator representing the presence of the non-Audio Video Bridging bridge, and
        indicate whether said Audio Video Bridging device received said received message from the non-Audio Video Bridging bridge.

20. An Audio Video Bridging device according to claim 19 wherein determining whether said Audio Video Bridging device received said message from a non-Audio Video Bridging bridge comprises determining whether said message was received on a port connected to a non-Audio Video Bridging bridge.

21. An Audio Video Bridging device according to claim 19 wherein indicating whether said Audio Video Bridging device received said message from a non-Audio Video Bridging bridge comprises generating a reply to a origin of said received message.

22. An Audio Video Bridging device according to claim 19 wherein indicating whether said Audio Video Bridging device received said message from a non-Audio Video Bridging bridge comprises forwarding said message downstream and wherein a forwarded message includes an indication of whether said Audio Video Bridging device received said received message from a non-Audio Video Bridging bridge.

23. A non-transitory computer readable medium comprising a set of instructions executable on at least one processor, said set of instructions comprising instructions for:
    transmitting at least one maintenance message via the processor running on at least one first server to one or more known Audio Video Bridging devices;
    receiving one or more replies from one or more of said known Audio Video Bridging devices, wherein the one or more Audio Video Bridging devices are communicably coupled to at least one processor running on at least one second server, the one or more replies including at least one data indicator representing the presence of a non-Audio Video Bridging bridge; and processing said one or more replies to determine whether the non-Audio Video Bridging bridge is present in a network.

24. The computer readable medium according to claim 23 wherein said processor is a processor of a residential gateway of a network.

25. The computer readable medium according to claim 23 wherein said processor is a processor of a set-top box of a network.

\* \* \* \* \*